United States Patent [19]

Hasselmann

[11] Patent Number: 4,672,842

[45] Date of Patent: Jun. 16, 1987

[54] SYSTEM AND METHOD FOR AUTOMATICALLY MONITORING LIQUID VOLUME CHANGES IN STORAGE TANKS

[76] Inventor: Detlev E. M. Hasselmann, 519 S. Nardo Ave., Solana Beach, Calif. 92075

[21] Appl. No.: 748,926

[22] Filed: Jun. 26, 1985

[51] Int. Cl.⁴ .............................................. G01M 3/26
[52] U.S. Cl. ...................................... 73/49.2; 364/564
[58] Field of Search ............. 73/149, 49.2, 40, 40.5 R, 73/290 R; 364/564, 550, 558, 521

[56] References Cited

U.S. PATENT DOCUMENTS

| | | | |
|---|---|---|---|
| 1,417,892 | 5/1922 | Ehrentraut | 73/292 |
| 1,777,415 | 10/1930 | Morgan | 374/142 |
| 2,677,276 | 5/1954 | Schmidt | 73/292 |
| 2,760,373 | 8/1956 | Quist | 73/317 |
| 2,902,859 | 9/1959 | Quist | 73/321 |
| 3,359,799 | 12/1967 | Lubin | 73/308 |
| 3,538,745 | 11/1970 | Wright et al. | 73/49.2 |
| 3,580,055 | 5/1971 | White | 73/40.5 R |
| 3,841,146 | 10/1974 | Cross et al. | 73/49.2 |
| 4,186,419 | 1/1980 | Sims | 73/313 X |
| 4,186,591 | 2/1980 | Mooney | 73/49.2 |
| 4,229,798 | 10/1980 | Rosie et al. | 364/564 |
| 4,281,534 | 8/1981 | Hansel | 73/49.2 |
| 4,300,388 | 11/1981 | Hansel et al. | 73/49.2 |
| 4,362,403 | 12/1982 | Mooney | 374/4 |
| 4,386,525 | 6/1983 | Mooney | 73/49.2 |

OTHER PUBLICATIONS

PEI Manual 83-1, "Tightness-Testing Systems for Underground Tanks", 9-1983.
Gimpel et al, Computer Inventories Oil in Refinery Tanks, Electronics, vol. 30, No. 10, Oct. 1957.

*Primary Examiner*—Stewart J. Levy
*Assistant Examiner*—Hezron E. Williams
*Attorney, Agent, or Firm*—Baker, Maxham & Jester

[57] ABSTRACT

An automated liquid volume monitoring system and method for determining storage tank leak rate. Volume changes necessary to maintain storage tank liquid level, and volume changes due to temperature changes, are substantially constantly measured and calculations are made to determine actual leak rate. Leak rate calculations are made frequently and averaged periodically to provide updated leak rate indications for a system operator.

51 Claims, 8 Drawing Figures

```
                 0.000  ←——— SCALE FOR THERMISTOR TEMP. ———→  0.100
                     59°F ←——— SCALE FOR A,B,M,T TEMP. ———→ 69°F
                ╱ TIME OF DAY (MINUTES PAST MIDNGHT)
                                            ╱ TOP TEMP.
         1299.77  >      X         BMT        +       A       <  0.26
                                         ╱ MID POINT TEMP.
           0.001  >      X         BMT        +       A       <  0.27
                                       ╱ BOTTOM TEMP.
           0.001  >      X         BMT        +       A       <  0.27
                                                  LEAK RATE (GAL/HR)╲
           0.001  >      X       B  MT        +       A       <  0.27
                              ╱ PLOTTED LEAK RATE
           0.001  >      X       B  M  T      +       A       <  0.27
                     ╱ LIQUID ADDED (GAL.)
           0.001  >      X       BM   T       +       A       <  0.27
                                        THERMISTOR TEMP.╲
           0.001  >      X         BMT        +         A     <  0.28

0.001  >      X         BMT        +         A     <  0.28
                                            AMBIENT TEMP ╲
           0.001  >      X         BMT        +         A     <  0.28

0.001  >      X         BMT        +       A       <  0.27

1305.  >      X         BMT        +       A       <  0.26

0.001  >      X         BMT        +       A       <  0.26
```

FIG. 4

SYSTEM AND METHOD FOR AUTOMATICALLY MONITORING LIQUID VOLUME CHANGES IN STORAGE TANKS

FIELD OF THE INVENTION

This invention relates generally to liquid level monitoring systems and more particularly relates to a precise automated system for monitoring liquid volume changes in a storage tank to determine leak rate in minimum time with maximum accuracy.

BACKGROUND OF THE INVENTION

Leaking underground storage tanks can be dangerous and costly. Where the tanks store fuel, leaks can mean loss of such valuable fuel and it can also mean contamination of community drinking water supplies. At the present time, nominal leakage and product loss from fuel storage is usually acceptable from an operational standpoint, but is not acceptable in terms of long-term environmental damage for the reasons stated above. Due to metering accuracy limitations, and the volumetric changes of petroleum products with temperature, inventory control data is usually inadequate for determining the existence of leaks. Therefore, verification of tank integrity requires the use of more precise measurement methods or monitoring procedures.

Several conditions can occur which require tests to determine the tightness of underground storage tanks and piping. Among the situations where such tests should be conducted are in the course of a tank upgrading program; where there is a suspicion of a leak because of stock inventory loss; when leak monitoring indicates ground contamination; when there is an accumulation of water in the tank; and upon completion of construction.

Although many factors may cause an underground tank to leak, corrosion of the tank and piping have been determined to be the principle causes.

There are several typical leak locations in underground storage tanks, and several factors contribute to leaks occurring from these storage tanks. External tank corrosion is the greatest single factor leading to leaks. One of the major causes of tank corrosion is the corrosive potential of the soil caused by long-term location of unprotected underground steel tanks in areas with high soil moisture content. Electrical conductivity of the soil appears to be one of the primary factors involved. Soil moisture content is an important condition which affects soil electrical conductivity and should be given special consideration in areas subject to high water tables, tidal fluctuations and high rainfall which may create high corrosion potential. Soil with a higher content of dissolved solids and salinity will also result in higher conductivity and therefore greater corrosion potential. In addition to soil moisture content, other site-specific factors such as buried metal objects and natural variations in soil characteristics, such as pH, can also contribute to the electrical potential at a given site. An additional factor is that lack of oxygen in the soil adjacent to the tank can enhance the growth of anaerobic bacteria which accelerates the corrosion process.

Improper installation practices can also lead to underground storage tank leakage and this would include improper preparation of the excavation pit which could result in tank rupture due to settling or uneven loads. Additionally, abrasion of the tank surface during installation can greatly increase the rate of localized corrosion.

Physical damage of the inside of the tank as a consequence of such factors as faulty management operations and inventory control operations can also contribute to leakage from underground storage tanks. An example of this is repeated contact at the same point in a tank by a dipstick while taking product level measurements, which can result in a weak spot in the tank.

Finally, a contributing factor to possible leakage is age of the tank.

While fiberglass tanks are sometimes used, the majority of tanks are constructed of steel. This is because steel offers substantially lower installation costs. However, a substantial number of fiberglass tanks are in use and have significant potential for developing leaks. Installation stresses and settling are often the cause of leaks developing in these types of tanks.

The current industry standard for threshold detection of leakage has been established by the National Fire Protection Association (NFPA) as 0.05 gallons per hour, regardless of tank size.

In detecting leakage, the impact of geometry is significant for large tanks. A small diameter but very tall tank is relatively easy to monitor since a small volume change will produce a relatively large liquid level change. However, most large storage tanks are constructed with large diameters and limited height for a number of reasons. This means that large volume change in such a tank will produce a small change in liquid level, tending to reduce the accuracy of any computations based on level measurements.

Typical tank leakage monitoring systems currently available have a practical tank size limitation of approximately 20,000 gallons for the NFPA standard of detection. Because of the problems associated with geometry and total volume for larger tanks, a substantially higher threshold detection level for these tanks can still provide valuable information and also might be all that one could determine from present systems.

Many of the systems presently available are relatively complex and require trained people who are very precise in all phases of the tank monitoring procedure. Also, many different types of devices are available, most of which measure absolute temperature and level changes in some way. One system works on the principle of buoyancy where the vertical position of a floating container is used in calculating volumetric changes. Others use sonic techniques, bubbling techniques, and still others use helium as a trace gas to detect leaks.

Most of the presently available leak monitoring systems for large storage tanks have one or more drawbacks. Many prior art systems require absolute temperature measurement, which is subject to substantially greater error than would result from measurement only of change in temperature, which is all that is really of interest. Additionally, large, cumbersome and relatively complex materials and equipment are necessary for many of the present systems. Further, skilled operators are frequently necessary, and operator interpretation can lead to significant costs and errors.

SUMMARY OF THE INVENTION

Broadly speaking, this invention may be termed a leak computer for determining whether or not liquid storage tanks and piping are tight. If there is a leak it provides accurate data as to the leak rate. This system meets the NFPA requirements of detecting leaks at least as small as 0.05 gallons per hour, regardless of tank size. In a preferred embodiment, this system measures leaks directly by maintaining a constant liquid level in the tank and measuring the amount of liquid that is added to or removed from the tank to keep the level constant.

The system is basically comprised of a level sensor floating on the liquid to send a signal to a computer when the level changes. The computer then activates a positive displacement pump which adds or removes liquid from a storage tank in very small increments to maintain a constant level. The computer counts the incremental pump strokes to calculate the amount of liquid transported between the storage tank and an auxiliary tank.

The temperatures at the top, middle and bottom of the storage tank are measured by appropriate resistance temperature sensors. Signals from these sensors are fed to the computer and used to indicate the extent of thermal agitation. A sensitive thermistor located at about the center of the storage tank detects a representative temperature in the tank. Studies have shown this location to be representative of the temperature changes occurring under most conditions and adequate for liquid volume change calculations due to temperature changes. This thermistor is connected in one leg of a Wheatstone bridge, the output of which is connected to the computer. The computer can read temperature changes of as little as 0.001° F., accurate to ±5%, from which it calculates an apparent leak caused by these temperature changes.

As inferred previously, current methods of tank integrity monitoring measure actual temperature and subtract the values taken at timed intervals to get a value of temperature differential. However, the actual value of temperature is not important. It is the temperature change, $\Delta T$, that is of interest in determining volume change due to temperature change. For this reason, the present invention does not measure and subtract two large numbers to obtain $\Delta T$, but measures $\Delta T$ directly.

The leak determined by the liquid transported by the pump is adjusted in the computer by the apparent leak due to thermal changes to arrive at the actual leak amount. The computer also measures the time interval between measurements in order to calculate the leak rate.

All observed values are sampled about once per second and typically 45 of these values are averaged to periodically provide a visual display on a video screen or on a strip chart. Further, the data produced by the computer can also be stored on diskettes to provide a permanent record for future use along with the visual strip chart record. The strip has alpha/numeric information and is provided by a conventional printer coupled to the computer output.

In an alternative embodiment, a floating rod coupled to a linear voltage differential transformer (LVDT) can be used to determine actual liquid level. The signals from the LVDT accurately represent liquid level changes and are coupled to the computer where they are converted to volumetric changes.

Still another embodiment determines the volume of liquid necessary to maintain constant liquid level by an accurate weighing system. The auxiliary tank is coupled with an accurate scale having an output signal representing liquid volume changes. When the detected liquid level is low, a valve is opened to add liquid to the storage tank. The difference in weight of the auxiliary tank is converted to liquid volume in the computer. This requires knowledge of density or specific gravity of the liquid in the auxiliary tank which must be accounted for in converting between weight and volume. When the detected liquid level is high, a pump is actuated to remove liquid from the storage tank and add it to the auxiliary tank. Thus, it can easily be appreciated that weight changes of the auxiliary tank are accurate indications of liquid volume changes in the storage tank.

There is also disclosed a novel method and apparatus for accurately and quickly determining when the tank has been filled and the liquid level is in the riser. A float rod with linear scale markings is provided in the riser. The volume of liquid for an increment change in level is constantly observed when the tank is nearly full. A rapid rise of the float rod with a small addition of liquid indicates that the liquid level is in the riser.

BRIEF DESCRIPTION OF THE DRAWING

The objects, advantages and features of this invention will be more readily appreciated from the following detailed description when read in conjunction with the accompanying drawing, in which:

FIG. 4 is a representative portion of a strip chart recording of the computer output over a period of several minutes;

DESCRIPTION OF PREFERRED EMBODIMENTS

Figure 1:
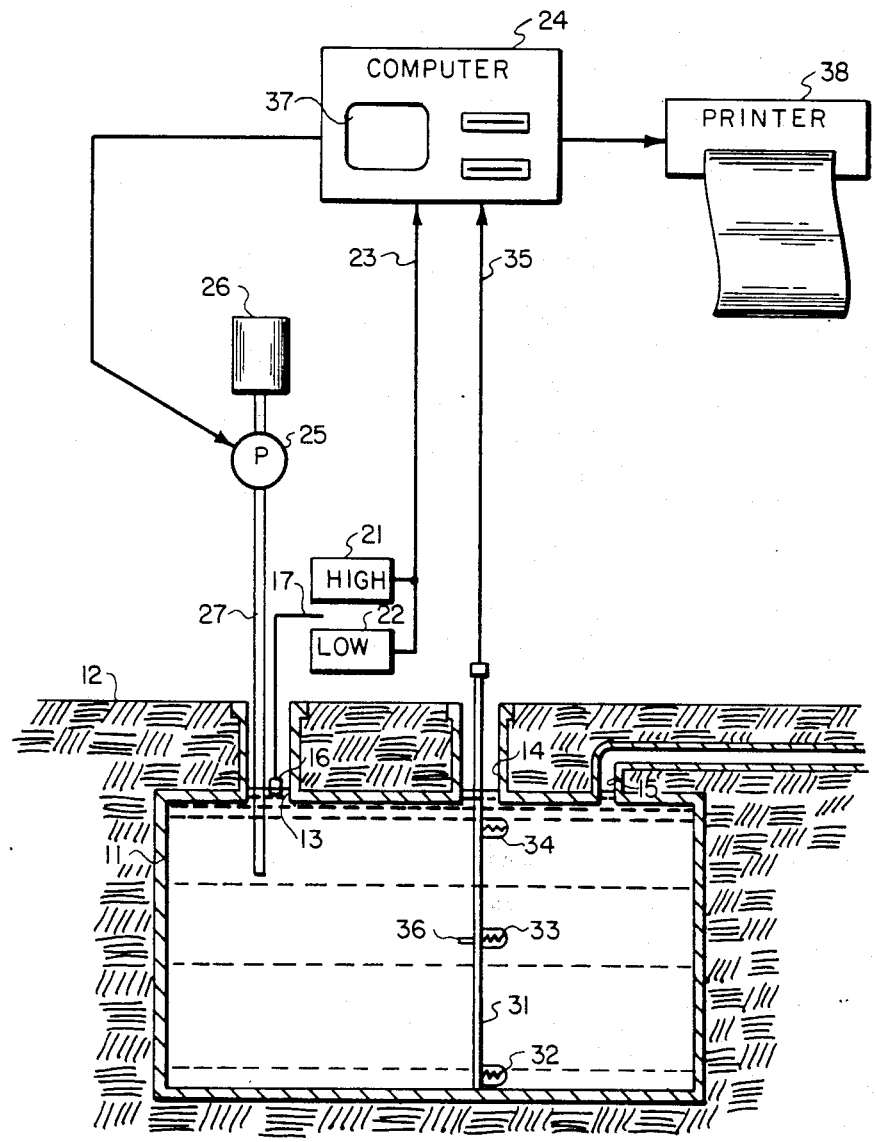
FIG. 1 is a schematic representation of the system of the invention in position with respect to a tank to be monitored.

With reference now to the drawing, and more particularly to FIG. 1 thereof, there is shown a storage tank 11 buried beneath ground level 12 and having accessible risers 13 and 14 extending upwardly from the top of the tank. Various conventional piping systems are indicated by the pipe 15 connected to the top of the tank. Typically the top of the tank is about four feet below ground level and there are four or five top piping or riser openings, each of about four inches in diameter. For proper operation of this system, the level of the liquid in the tank should be just above the top of the tank, into the riser. At this location, the test is concerned only with the level of liquid in the tank and not in the piping, the major portion of which is normally located well above the top of the tank. An advantage of measuring at this location is that relatively small changes in liquid volume result is measurable level changes since the area of the piping at that level is quite small compared with the area of the tank itself.

Float device 16 is located in riser 13 and has an associated actuator 17 cooperatively arranged with HIGH and LOW sensors 21 and 22. The level sensors typically have a sensitivity of 0.05 inch (1.27 mm), allowing detection of as little as 0.01 gallon change in total volume in a tank having a storage capacity of many thousands of gallons. Signals from these sensors are coupled by means of line 23 to computer 24. When the level of the liquid in riser 13 falls sufficiently to be detected by LOW sensor 22, the computer sends a signal to pump 25, connected between auxiliary tank 26 and flow pipe 27 which extends into tank 11, to transport liquid from the auxiliary tank into the storage tank. The pump, preferably of the positive displacement type, is capable of transporting liquid in very small and accurate increments, such as 0.0005 gallons per stroke, and the computer measures the number of such increments necessary to maintain a constant level in the storage tank. Thus, when float 16 drops sufficiently to actuate LOW level detector 22, the pump will add liquid to the tank until actuator 17 moves upward sufficiently to deactuate the LOW sensor. Likewise, when the level in the tank rises such that actuator 17 engages HIGH sensor 21, a signal is sent to the computer which then actuates pump 25 to remove liquid from the storage tank and add it to the auxiliary tank. Similarly, the number of increments of fluid removed from the storage tank are counted and the total volume of liquid transported out of the tank is calculated by the computer. Although shown as a single pump and pipe, the invention contemplates an inlet pump and pipe and a separate outlet pump and pipe. Pumps other than the positive displacement type also may be used.

Volumetric changes in the liquid in the tank can be computed by applying the thermal coefficient of expansion to detected temperature changes. The accuracy of these volumetric computations depend on the accuracy of the temperature differential measurements.

A temperature probe 31 extends substantially to the bottom of the tank through riser 14. Although two risers are shown in FIG. 1, it is possible that both the level sensor and the temperature probe, as well as the flow pipe, could extend through a single riser. Temperature sensors 32, 33 and 34 are located on probe 31 at the bottom, middle and top of tank 11 respectfully, and the temperatures sensed by these detectors are fed to the computer by means of line 35. These temperature sensors may be any suitable device such as platinum resistance temperature detectors.

Sensitive thermistor 36 is connected, through line 35, as one leg of a Wheatstone bridge, the output of which is fed to computer 24 as will be discussed in greater detail with respect to FIG. 2. Based on temperature changes of the liquid in the tank, the computer determines the liquid volume change due to thermal expansion or contraction and balances that against the actual volume changes determined by the amount of liquid pumped in or out of the tank. The resultant information, including actual temperatures and actual volume of fluid transported between the tanks, together with a calculation of leak rate, is indicated on display 37, or alternatively on strip chart printer 38, or both. Clock means are provided in the computer to measure the time interval between measurements and thereby to calculate the leak rate.

Figure 2:
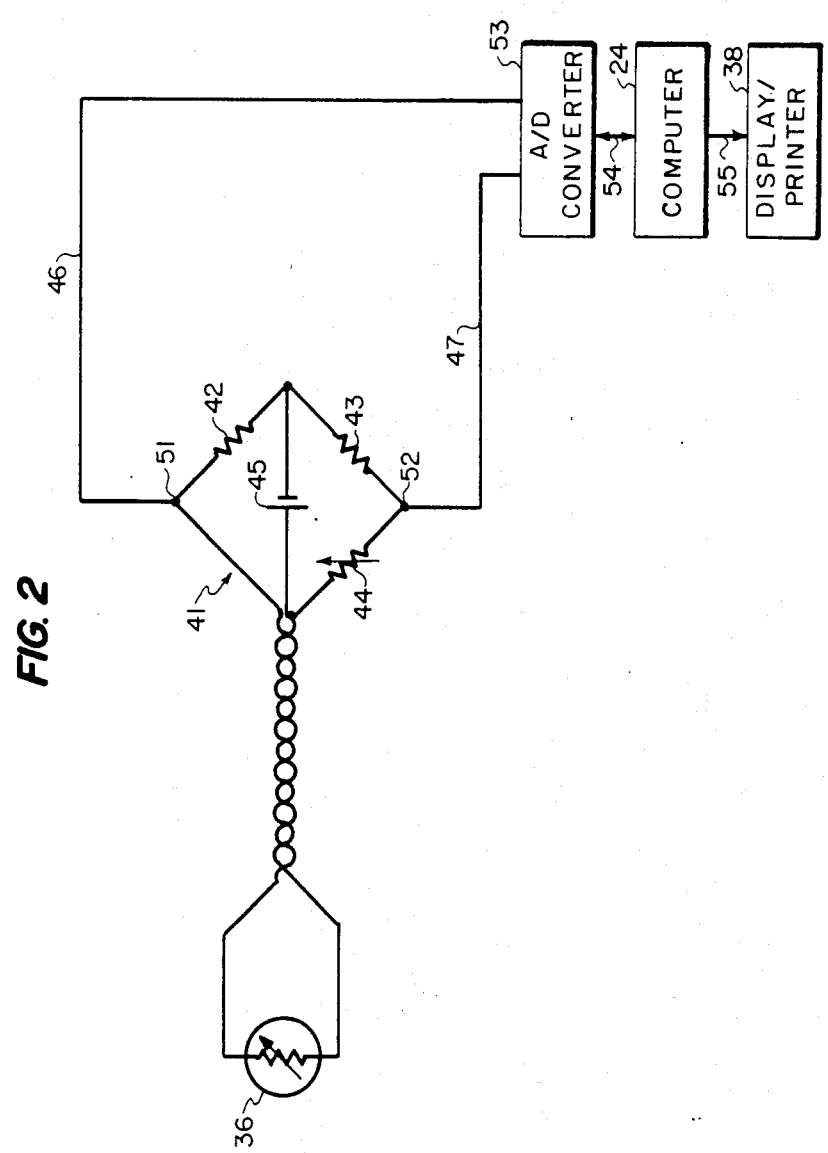
FIG. 2 is a partial schematic, partial block diagram of the temperature change measurement and calculation portion of the invention.
Figure 3:
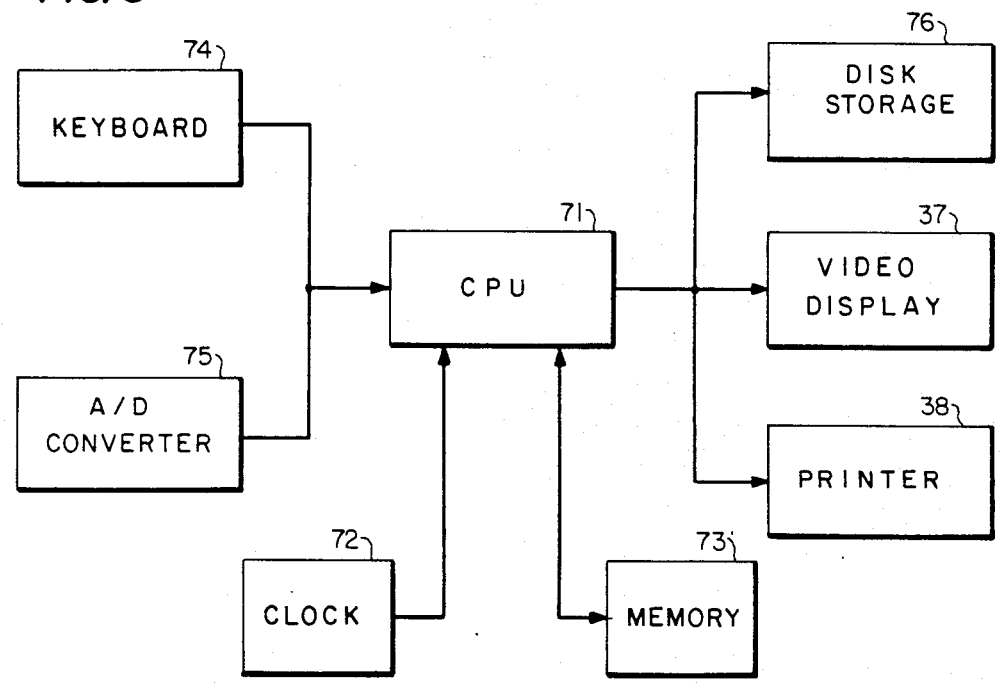
FIG. 3 is a block diagram showing the various components of the data handling portion of the system.

A block diagram of the basic computational portion of the system is shown in FIG. 3. Computer 24 includes a central processing unit (CPU) 71 having a real time clock input 72. Memory 73 contains all of the information needed for the CPU, together with its internal programming, to perform the desired functions. Certain information is entered in memory at the scene of the test as will be explained below with respect to the flow chart of FIG. 5. Other inputs to the CPU are from data entry keyboard 74 and analog-to-digital (A/D) converter 75. The converter may be the same, or different from, or in addition to, A/D converter 53 of FIG. 2. There may be several analog inputs for the CPU which would go through a converter.

Outputs of the CPU include printer 38, video display 37 and disk storage 76. The disk storage not only provides archival storage of data, it permits the data to be recalculated at a later time. This could have value for detecting patterns since the data could be recalculated with even longer averaging times. It also allows further statistical analysis.

To further elaborate on the computations carried out by the computer, the basic values and equations involved are here set out in more detail. For a particular system and for a particular fluid stored in a tank, the information stored in the computer memory includes the coefficient of volumetric expansion, K[(gallons)/(gallon−° F.)]. The positive displacement pumps have the characteristics GI (gallons/stroke input) and GO (gallons/stroke output). At the beginning of a test run, an initial input is the storage tank volume, V, in gallons. Inputs to the computer, from actual real time measurements are:

SI = pump input strokes
SO = pump output strokes
T = temperature in °F.
t = clock time in hours.

One calculation performed by the computer is volume change due to liquid added or removed:

$$QL = \frac{(GI) \times (SI) - (GO) \times (SO)}{t_1 - t_2} \quad (1)$$

where $t_1 - t_2$ is a time increment during the test period. The related calculation is volume change due to temperature variations:

$$QT = \frac{(T_1 - T_2) \times (K) \times (V)}{t_1 - t_2} \quad (2)$$

where $T_1 - T_2 = \Delta T$.

Finally, from the above calculations, the computer determines leak rate (L) for the particular time increment:

$$L = QL - QT. \quad (3)$$

The extremely sensitive temperature variation (ΔT) circuit is shown in FIG. 2. A Wheatstone bridge 41 has two legs with fixed resistors 42 and 43, a variable resistor 44 in one leg for calibration purposes, and thermistor 36 in the remaining leg. The bridge circuit can provide temperature differential readings accurate to four decimal places. A low, constant DC voltage source 45, typically 1.5 volts, is connected across the bridge as shown. Output lines 46 and 47 from bridge nodes 51 and 52 respectively are fed to A/D converter 53, the output of which is coupled, typically by an RS232 bus 54 to computer 24. An output of the computer may be coupled to printer 38, again possibly by an RS232 bus 55. The term "Wheatstone bridge" should be understood to mean any equivalent circuit which can function in a similar way to provide useful and accurate signal in response to very little external change.

The volumetric coefficient of thermal expansion is a well known quantity for many liquids. The nominal value for gasoline is 0.00068 per degree F. This value can be determined even more accurately, if necessary, by measuring the temperature and applying the API (American Petroleum Institute) specific gravity index for each test.

It is important to note that the present invention computes volume variations due to directly measured temperature change rather than measuring actual temperature and subtracting one value from another, which is typical for other leak detector systems. This temperature change, $\Delta T$, is used with the appropriate value for the coefficient of expansion to calculate apparent liquid volume changes.

The Wheatstone bridge, with a precision thermistor in one leg, can provide precise, direct readings of $\Delta T$, sensitive to $0.001°$ F., accurate to $\pm 5\%$. This extreme accuracy is possible because the system averages a relatively large number of calculations for each displayed result. Thus, 40 to 60 separate readings of bridge output signals are used to obtain a precise $\Delta T$ measurement, which is then employed in determining liquid volume changes due to temperature changes approximately once per minute or slightly more frequently. At the present time, 45 calculations appear to provide an adequate number of readings for accuracy, while taking a relatively short time. At this rate, four averaged displays can be made in three minutes, at the rate of about one temperature reading per second. Of course, readings can be taken more or less frequently and the number of calculations to be averaged could be varied. Changes in the number of calculations averaged for each displayed result can be adjusted by the operator in the field.

It is important to note that a temperature change sensed by the Wheatstone bridge is based on a reference temperature. This means that the bridge is zeroed at the beginning of each test. The present system can measure to the accuracy mentioned over a normal ambient temperature range as opposed to prior art devices which read actual temperature to three decimal places but are only accurate to $\pm 0.0015°$ F. Further, with actual temperature readings, errors may be cumulative. For example, a reading accurate to $\pm 0.001°$ F. subtracted from another reading accurate to $0.001°$ F. results in a possible error of $\pm 0.002°$ F. Thus, with the kind of accuracy of the earlier devices, the subtraction may lead to substantial temperature errors, and consequent leak rate calculation errors.

In contrast with prior art systems which use a large thermometer scale to provide an actual reading of temperature, the present invention provides the temperature change, $\Delta T$, on a magnified thermometer scale which can be effectively moved all over the temperature range. Thermistor 36, because it is connected in a very sensitive Wheatstone bridge, can measure over a temperature range of a fraction of a degree, such as, for example, $0.100°$ F. It does not have to read the actual temperature, which would be several hundred times larger. For this reason $\Delta T$ may be determined to five decimal places with extreme accuracy. The readings provided by this invention are accurate to $\pm 0.00005°$ F., and do not involve subtracting two numbers, each of which may be accurate to $\pm 0.001°$ F., possibly resulting in cumulative errors.

An important distinction of this invention from many prior art systems is that the earlier devices take readings many minutes apart, some of them approximately 4–10 times per hour. The present system makes calculations at a much higher rate, approximately 3600 per hour, thereby contributing significantly to its ultimate accuracy. This advantage is made possible by the fact that the calculations of leak rate are made automatically, using a programmed microcomputer with its attendant high speed.

Another advantage stemming from the rapidity of measurements and calculations afforded by this invention is that trends can be determined much more quickly. This system can extract the necessary information in much shorter time intervals. If five data points are needed to establish a trend, this invention can provide the necessary information within five minutes. In tank monitoring systems that make calculations every 15 minutes, it would take $1\frac{1}{4}$ hours to obtain the necessary five data points.

This system can detect leaks which occur at rates less than 0.05 gallons per hour. Further, it provides an accurate reading of leak rate, rather than merely whether or not the threshold level of 0.05 gallons per hour has been exceeded. With this device, again as opposed to absolute temperature measuring devices, thermally related errors are significantly reduced and are not cumulative. Since $\Delta T$ is so accurately determined, any errors in volume calculations due to inaccuracies in temperature measurements are insignificant.

Temperature stratification is a desirable factor in storage tanks. When temperature stratification is fully developed, normally some time after a tank is filled, there is no appreciable thermal agitation. This results in the various temperature layers acquiring a relatively uniform temperature change. This smooth temperature change is easily observed and compared with the temperature oscillations prior to stratification. The present invention measures the temperature at the top, middle and bottom of the storage tank by means of detectors 34, 33 and 32 respectively. If desired, middle detector 33 could be omitted and only the top and bottom readings used. Alternatively, the output of the bridge could be employed by the computer to determine actual center temperature if desired.

It is possible to determine the amount of thermal agitation by detecting and recording the temperature readings. If the top temperature is colder than the bottom, it indicates that thermal agitation is present. This invention accounts for the effects of thermal agitation by continuously calculating the leak rate with the display clearly indicating when stratification has developed. Because it operates in this manner, the present invention can be employed as soon as the storage tank is filled, without having to wait for several hours to ensure stabilized temperature stratification. Even though the test will take somewhat more time if significant thermal agitation is present, the output display of the system shows when results start improving. Without a continuous readout, the operator would not know when stratification had occurred and unnecessary time could be expended to wait for it. With this system the operator can quickly determine when data is reliable and minimal time is required.

One benefit of having the actual temperature readings available is to assess the validity of temperature differential, $\Delta T$, values. If $\Delta T$ is fluctuating through relatively wide reading variations, both up and down, it could be evidence of thermal agitation. The different level temperature readings will confirm agitation if the top is colder than the bottom. Indications of developed stratification are relatively small and smooth changes in ΔT and temperature sensor readings with the top warmer than the bottom.

The only notable effect of thermal agitation is that the monitoring process must be run longer, until the calculated leak rates stop wide fluctuations, and there are approximately 15 minutes of relatively consistent leak rate readings. Even if there is significant agitation, the time for running the tests with the system, to obtain accurate leak rate data, is frequently as little as one hour and seldom would be expected to take more than two hours. Thus, the tank being tested is out of service for a relatively short time and the test results are very accurate and dependable.

There is another benefit from the fact that the present system maintains a constant liquid level which is just above the top of the tank in the riser. Most tanks normally have one or more vapor pockets at various uneven locations at the top of the tank. The primary effect of vapor pockets is a sudden level change when the vapor escapes. This occurs when a liquid level change uncovers a vapor pocket and it often happens with earlier monitoring systems because they depend on relatively large changes in level for their measurements and calculations. The system of this invention maintains a substantially constant liquid level to within 0.05 inch (1.27 mm), resulting in the virtual elimination of the opening or closing of vapor pockets.

A factor frequently taken into consideration in measuring storage tank integrity is deflection of the tank ends. This factor is minimized in the present system by maintaining the liquid level minimally higher than the top of the tank and by allowing no more than 0.05 inch (1.27 mm) in level changes. Some systems require filling of standpipes to above grade and this can cause a significant pressure increase on the ends of the tank. Tank end deflection tends to occur rapidly at the beginning of a test before the tank has settled into an equilibrium state with respect to the soil in which it is buried. As the tank end deflection slows down to its final rest position, the apparent leak rate caused by that movement decreases. By continuously observing and recording the apparent leak rate, the system of this invention can determine when tank end deflection has decreased to the point where it has a minor effect on the leak rate. Because the present system only requires the tank to be filed just in to the riser, tank end deflection has been determined to be insignificant for proper functioning of this system.

Typically, the computer samples the measurement signals from the temperature sensor and the volume displacement and adds or removes liquid once each second. The computer then averages 45 of these measurements, calculates the leak rate and displays the result on a video screen or on a strip chart printed by a standard alpha/numeric printer, or both, together with a precise time reading at the end of each 45 counts. The strip chart has time as the vertical axis and displays temperature readings, T, time, the amount of liquid added or removed and the calculated leak rate in figures as well as providing a graphical representation thereof. This is shown in FIG. 4. Additionally, the computer averages several minutes (typically 10-30) of leak rate values and then displays the moving average. Thus, the display shows readings every 45 seconds or counts and is refreshed with the average of the past 10-30 minutes and adjustments are made as necessary to insure that no readings go off the chart. Accuracy is enhanced because of the statistical results of taking a running average of the leak rate.

Although there are other acceptable ways to test the tank piping for integrity, this system can also perform such tests. As indicated previously, the basic tests on the tank are conducted with the liquid level just above the top of the tank into the risers. Additional liquid can be added to the riser to fill the piping system in addition to the tank. A few readings on the strip chart recorder will very quickly show whether there is any difference in total system leak rate compared with the leak rate of the tank itself. Conversely, the tank could be filled all the way to the top of the piping system, readings taken, and then liquid removed to one or more different levels, depending upon the piping system or tank being monitored.

Figure 5:
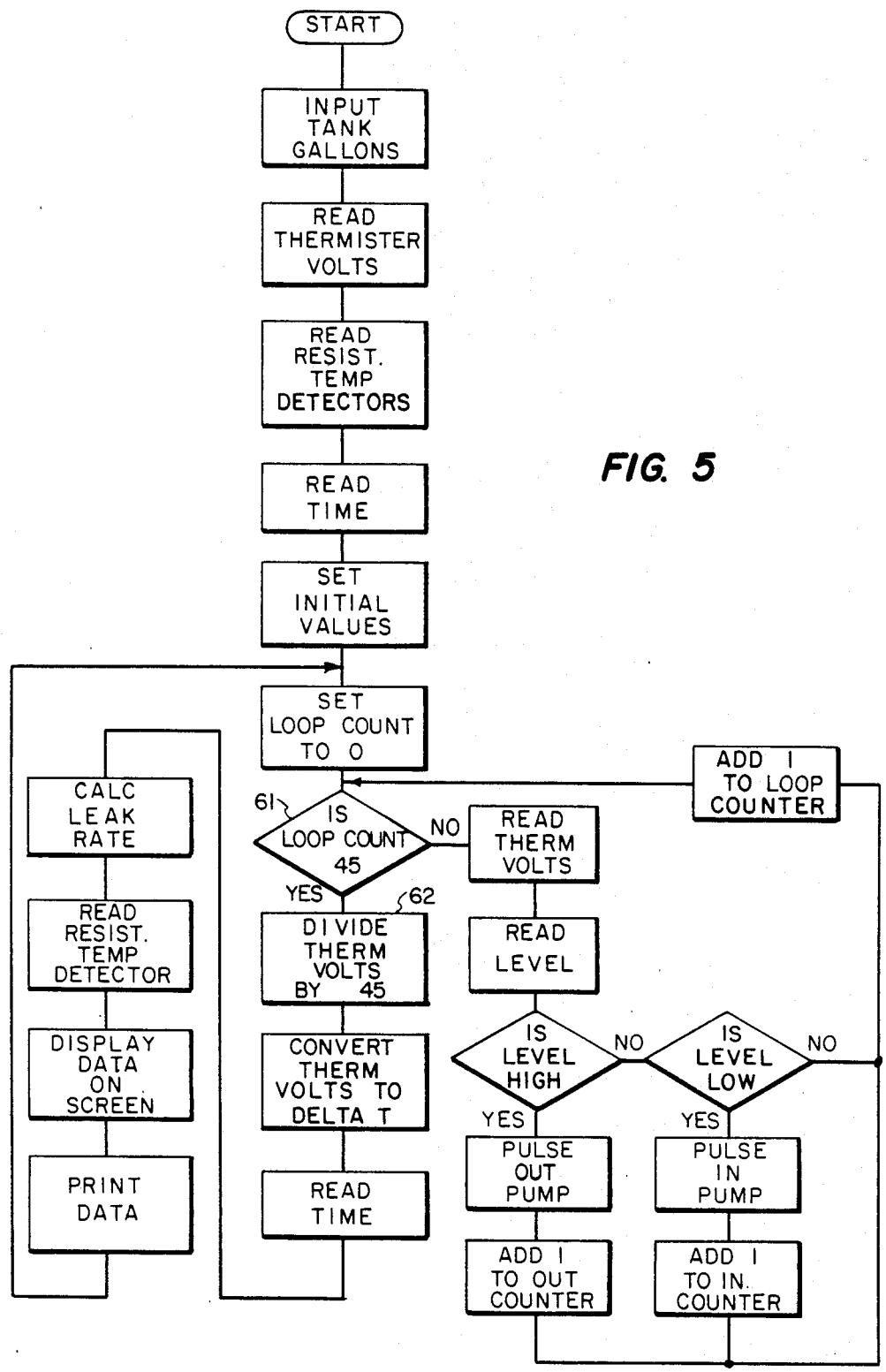
FIG. 5 is a flow chart of the program portion of the system.

The program in the computer is evidenced by the flow chart of FIG. 5. At the start of the process, initial values are set into the computer. The tank capacity in gallons is inserted manually. The computer automatically reads the thermistor value in volts, the actual temperature readings of the three temperature sensors and the time. After the initial values are set into the computer, the loop count is set at 0 readings. In block 61 the computer determines whether or not 45 readings have occurred. If the answer is NO, another set of values is read, including the thermistor volts and the liquid level sensors. If the level is high, that is, HIGH level sensor 21 has been actuated by actuator 17, a signal is sent to pulse the liquid level removal pump and for each pulse ONE is added to the positive volume counter. If the level is low, the other pump is pulsed and for each pulse ONE is added to the negative volume counter in the computer. For each set of readings, ONE is added to the loop counter, indicating that another set of readings was taken. When the total number of readings taken is equal to 45, the system proceeds to block 62 indicating that the thermistor volts are divided by 45 and converted to an average temperature change value. Then the time is read and from the arithmetic sum of the amount of liquid increments added to or removed from the tank, adjusted for temperature volume changes, the leak rate is calculated. At the same time, the temperature detectors are read and the various elements of information are shown on the video screen or are printed on the strip chart (see FIG. 4). It may also be recorded in a diskette for permanent storage. The system then resets to 0 count and goes through another 45 readings before new updated information is displayed.

Figure 6:
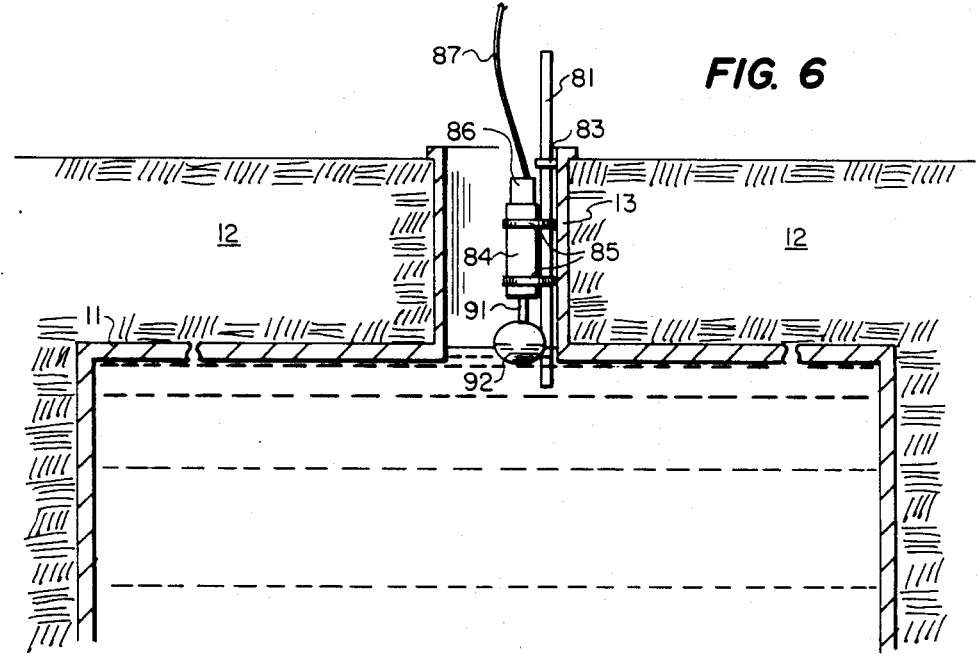
FIG. 6 is a schematic representation of an alternative level determining apparatus employing a linear voltage differential transformer.

The LVDT level measuring system is shown in FIG. 6. Rod 81 is attached to riser 13 of tank 11 by means of clamp 83. The outer sleeve 84 of the LVDT is secured to rod 81 by straps 85. The LVDT electronics are contained in housing 86 at the top of sleeve 84. Power in, typically 15 volts for the two separate inductive windings, and signals out, in the 5 volt range, are passed through wires 87. Level change indication signals from the LVDT would be coupled to the computer through the A/D converter. The output signals result from longitudinal movement of a small rod within a central bore through sleeve 84. A nonmagnetic extension of that central rod 91 extends downwardly, supported by float ball 92 at the liquid surface.

The LVDT is extremely accurate, sensitive to 0.0001 inch (0.00254 mm). Although shown in the riser, an LVDT can be used to measure liquid level in the tank.

There may be times when it is desired to obtain tank integrity information when the liquid level is below the riser. With the LVDT, one may compute volume changes directly from detected level changes, without maintaining a constant liquid level. This requires a different volume computation step but the computer operates in the same general way as previously described. If desired, the constant liquid level technique could also be employed in conjunction with level change signals generated by the LVDT.

Figure 7:
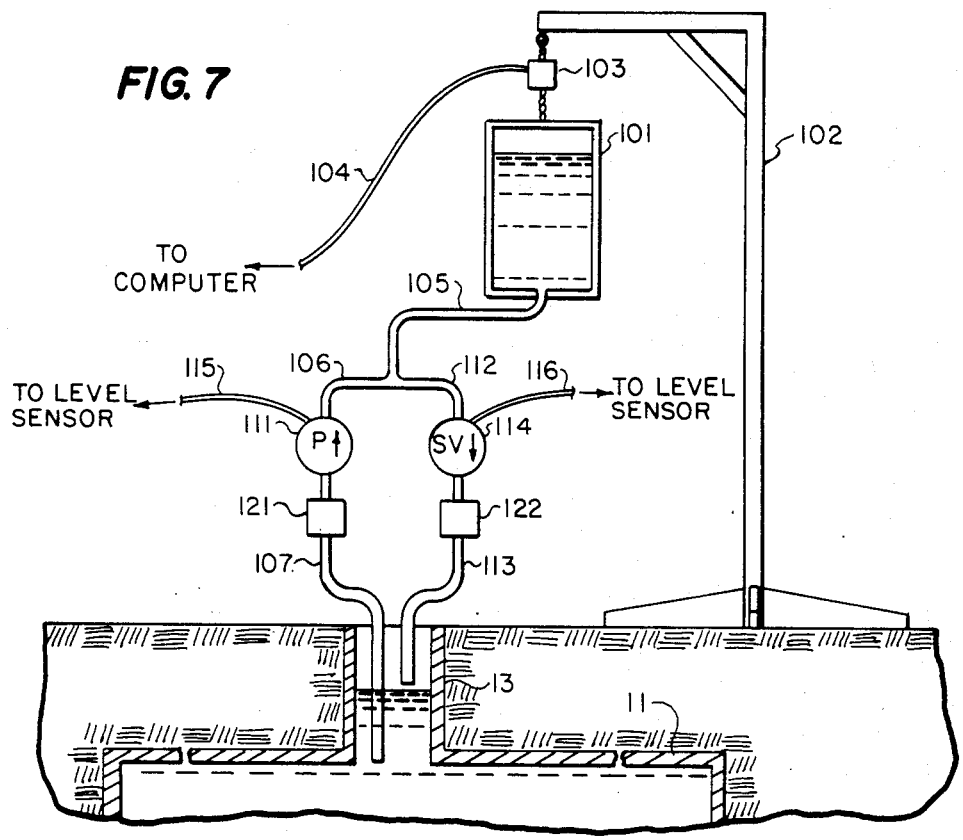
FIG. 7 is a schematic representation of an alternative embodiment of apparatus to measure liquid volume changes using a weighing system.

Alternative methods for determining the volume of liquid needed to maintain constant liquid are shown in FIG. 7. Auxiliary tank 101 hangs from stand 102 through extremely accurate load cell 103. Electronic signals from the load cell are coupled to the computer through wire 104. Liquid conduit 105 has branch 106 connected to outlet pipe 107 through pump 111. Liquid conduit branch 112 is connected to inlet pipe 113 through solenoid valve 114.

A level sensor as shown in either FIG. 1 or FIG. 6 may be used in conjunction with this weighing system. Control signals from the level sensor are connected to the pump through wire 115 and to the solenoid through wire 116. Alternatively, control signals could be connected between the computer and the pump and solenoid valve for control thereof.

Another method for accurately measuring liquid added to and removed from the storage tank is by means of flow meters 121 and 122 in the respective outlet and inlet pipes. They may be used in place of either the incremental pump apparatus of FIG. 1 or the weighing system of FIG. 7.

Referring to the weighing system, when the tank level drops a detectable amount, a signal from the level sensor opens solenoid valve 114, allowing liquid to flow by gravity into the storage tank. Any of the three means discussed may be employed to accurately measure the volume of liquid transferred. When the liquid level in the tank rises a detectable amount, a signal from the level sensor starts pump 111 to remove liquid until the predetermined level is again achieved. In the preferred embodiment the computer only interrogates load cell 103 in the same manner as it interrogates the Wheatstone bridge for temperature information. With that information actual volume change is determined from the weight change and again compared with temperature caused volume change. Another factor that the computer needs as an initial input is the density or specific gravity of the liquid in the auxiliary tank. This is a conventional and well known requirement.

The load cell could be as simple as another Wheatstone bridge with a strain gauge in one leg in the same position as the thermistor in FIG. 2. Some load cells are sold with all of the electronic built-in to provide an accurate electronic signal output.

Figure 8:
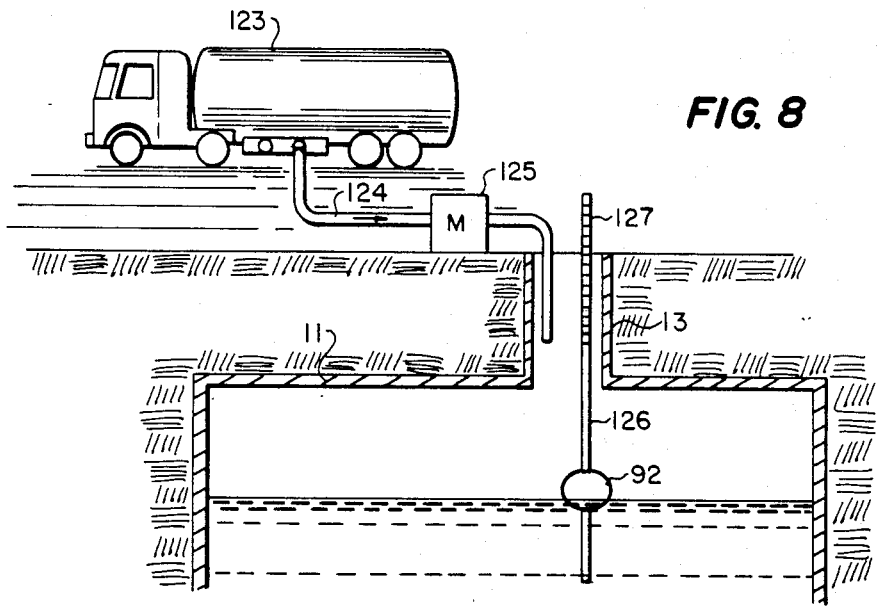
FIG. 8 is a schematic representation of the system for determining when the liquid level has reached the riser.

Apparatus for accurately determining when the tank is full and the liquid level has entered the riser is shown in FIG. 8. When the liquid level approaches the top of tank 11, float rod 126 is placed in riser 13 with scale markings 127 at the top of the riser. Tank truck 123 pumps liquid through nose 124 and flow meter 125 into the storage tank. As the liquid level approaches the riser, the flow meter readings are compared to the level readings. Near the top of the tank it is common to require 25-30 gallons to raise the liquid level by one inch. When the liquid level reaches the riser, as little as ¼ gallon can result in a one inch change in liquid level. Thus by taking readings at every inch, it is easy to determine when the tank is full and the liquid has entered the riser. Measurements are continued as liquid level goes up in the riser, to indicate when the piping is being filled and to show how much volume is required for incremental liquid level changes at different levels.

Note that if the tank is not level, the fact that liquid is rising into the riser will not indicate a full tank until the air pockets are full. The rate of float rod rise may increase but the expected very rapid rise will not occur until only the riser or risers are being filled.

To simplify and reduce the possibility of operator error, a graph is provided with float rod height as the ordinate and gallons as the abscissa. A gentle upward slope is observed until the tank is filled, and then an abrupt rise is evident, unmistakably indicating that only the riser is being filled.

As the liquid level reaches and floods the horizontal pipes attached to the risers, the graph slope decreases or it levels out again. When the liquid has risen to the point where the pipes are completely flooded, the graph slope will again rise sharply. This provides a graphical image of the underground piping attached to the storage tank.

This procedure may also be used to determine the level of vapor and vent piping attached to the tank. When the liquid level reaches the pipes, there is a decrease in level change for equal amounts of liquid added. This procedure can then be used to calibrate the risers for measuring leak rate at all levels as well as to plot attachment points and volumes of attached piping.

It is of interest to note that in comparison with the complex gear required for some prior art systems, requiring a dedicated automotive vehicle, the entire apparatus for this invention can easily be transported in a pick up truck and a single person can accomplish the test and provide the results to the station operator at that time. The system is essentially safe and no higher education is necessary beyond basic high school and minimum computer familiarity. The equipment can be calibrated in the field at the job site, including the thermistor in the bridge. Known precision resistance devices can be used for this purpose, substituted in the bridge for the thermistor.

Operator calculations and observations, critical to proper functioning of many earlier tank monitoring systems, are not required for proper operation of this system. This storage tank monitor provides leak rate monitor readings automatically, once it is set up.

In view of the above description, it is likely that modifications and improvements will occur to those skilled in the art which are within the scope of the appended claims.

What is claimed is:

1. An automated liquid volume change monitoring system for a storage tank, said system comprising:
  level sensor means positioned to detect the existence of small changes from a predetermined liquid level in said tank;
  means for providing a signal from said level sensor means indicative of the existence of rise or fall of liquid level in said tank;
  liquid transport means responsive to said level sensor signal to maintain liquid level substantially constant by selectively adding liquid to and subtracting liquid from said tank, said liquid transport means functioning only when the liquid level in said tank is other than at said predetermined level;
  means for computing the volume of liquid change in said tank by measuring the liquid added to or removed from said tank as necessary to maintain substantially constant liquid level;

means for providing a signal representative of liquid volume change due to the addition or removal of liquid from said tank; temperature sensing means comprising:

electrically variable resistance means located within said tank at a position representative of average temperature of the liquid therein, the resistance of said resistance means changing substantially proportionally to the incremental temperature change of the liquid within said tank;

means for sensing values of said variable resistance; and means for providing an output signal from said resistance value sensing means representative of incremental change in temperature detected by said variable resistance means;

means responsive to said signal from said resistance value sensing means to calculate tank liquid volume change due to incremental temperature change;

means to provide a signal representing thermal liquid volume change;

computation means responsive to said signal representing liquid volume change due to thermal changes and to said signal representing liquid volume change necessary to maintain substantially constant liquid level in said tank to provide a signal representing storage tank leak rate; and means for providing indication of the leak rate.

2. The storage tank monitoring system recited in claim 1, wherein said level sensor means comprises:
a floating element; and
means to convert position of said floating element to a signal representing rise or fall of the liquid level.

3. The storage tank monitoring system recited in claim 2, wherein said position converting means comprises a linear variable displacement transformer.

4. The storage tank monitoring system recited in claim 1, further comprising:
liquid flow pipe means extending from an external location into the liquid in said tank;
pump means connected in said flow pipe means;
auxiliary tank means connected to said flow pipe means through said pump;
means responsive to said rise and fall indication signal to provide a level adjustment signal; and
means connecting said level adjustment signal to said pump to energize said pump means to transport said liquid between said storage tank and said auxiliary tank to maintain the liquid level in said storage tank substantially constant;
said volume computing means being responsive to said levle adjustment signal to calculate the amount of liquid transported between said storage tank and said auxiliary tank and provide a signal representing liquid volume change.

5. The storage volume monitoring system recited in claim 4, wherein said level sensor means and level sensor signal providing means comprises a float device connected to an actuator means for selectively actuating high and low level sensors.

6. The storage tank monitoring system recited in claim 4, wherein said computation means comprises a programmed microcomputer.

7. The storage tank monitoring system recited in claim 5, wherein said computation means comprises a programmed microcomputer.

8. The storage tank monitoring system recited in claim 4, wherein said pump means are incremental, positive displacement pump means.

9. The storage tank monitoring system recited in claim 8, wherein said pump means comprises a liquid adding pump and a liquid removal pump, both coupled in said flow pipe means between said storage tank and said auxiliary tank, said pumps being actuated by the level adjustment signal.

10. The storage tank monitoring system recited in claim 9, wherein said flow pipe means comprises an inlet pipe and an outlet pipe, one of said pumps being connected in each said pipe.

11. The storage tank monitoring system recited in claim 1, wherein said indication means is human perceivable.

12. The storage tank monitoring system recited in claim 1, wherein said indication means comprises means to produce a strip chart record showing time increments and plotting liquid temperature, liquid volume change and leak rate related to the time increments shown thereon.

13. The storage tank monitoring system recited in claim 1, wherein said indication means comprises a video screen.

14. The storage tank monitoring system recited in claim 1, wherein said resistance value sensing means comprises a bridge circuit having said variable resistance means as one of its legs.

15. The storage tank monitoring system recited in claim 14, wherein said bridge circuit including said variable resistance means is capable of measuring temperature changes as low as 0.001° F. to ±5%.

16. The storage tank monitoring system recited in claim 1, wherein said computation means comprises a programmed microcomputer.

17. An automated liquid volume change monitoring system for a storage tank, said system comprising:
level sensor means positioned to detect the existence of small changes from a predetermined liquid level in said tank;
means for providing a signal from said level sensor means indicative of the existence of rise or fall of liquid level in said tank;
liquid flow pipe means extending from an external location into the liquid in said tank;
pump means connected in said flow pipe means;
auxiliary tank means connected to said flow pipe means through said pump;
temperature sensing means comprising:
electrically variable resistance means located within said tank at a position representative of average temperature of the liquid therein, the resistance of said resistance means changing substantially proportionally to the incremental temperature change of the liquid within said tank;
means for sensing values of said variable resistance; and
means for providing an output signal from said resistance value sensing means representative of incremental change in temperature detected by said variable resistance means; means responsive to said rise and fall indication signal to provide a level adjustment signal;

means connecting said level adjustment signal to said pump to energize said pump to transport said liquid between said storage tank and said auxiliary tank to maintain the liquid level in said storage tank substantially constant;

means responsive to said level adjustment signal to calculate the amount of liquid transported between said storage tank and said auxiliary tank and provide a signal representing liquid volume change;

means responsive to said signal from said resistance value sensing means to calculate tank liquid volume change due to temperature change;

means to provide a signal representing liquid volume change due to temperature change;

computation means responsive to said signal representing liquid volume change due to temperature change and to said signal representing actual volume change necessary to maintain substantially constant liquid level in said tank to provide a signal representing storage tank leak rate; and means for providing indication of the leak rate.

18. The storage tank monitoring system recited in claim 17, wherein said level sensor means and level sensor signal providing means comprises a float device connected to an actuator means for selectively actuating high and low level sensors.

19. The storage tank monitoring system recited in claim 17, wherein said resistance value sensing means comprises a bridge circuit having said variable resistance means as one of its legs.

20. The storage tank monitoring system recited in claim 19, wherein said bridge circuit including said variable resistance means is capable of measuring temperature changes as low as 0.001° F. to ±5%.

21. The storage tank monitoring system recited in claim 17, wherein said pump means comprises a two solenoid actuated one shot positive displacement pumps which return to a home position after each incremental actuation.

22. The storage tank monitoring system recited in claim 17, wherein said computation means comprises a programmed microcomputer.

23. The storage tank monitoring system recited in claim 17, wherein said indication means is human perceivable.

24. The storage tank monitoring system recited in claim 17, wherein said indication means comprises an alpha-numeric printer which produces a strip chart record.

25. The storage tank monitoring system recited in claim 17, wherein said indication means comprises a video screen.

26. The storage tank monitoring system recited in claim 1, further comprising:
liquid flow pipe means extending from an external location into the liquid in said tank;
level adjusting means connected in said flow pipe means;
auxiliary tank means connected to said flow pipe means through said pump;
precision weighing means coupled with said auxiliary tank means to accurately determine liquid weight differences within said auxiliary tank means;
means to provide a signal to said volume computing means from said weighing means representing the weight of liquid in said auxiliary tank means;
means responsive to said rise and fall indication signal to provide a level adjustment signal; and means connecting said level adjustment signal to said level adjusting means to energize said level adjusting means to transport said liquid between said storage tank and said auxiliary tank to maintain the liquid level in said storage tank substantially constant;
said volume computing means being responsive to said weighing means signal to calculate the amount of liquid transported between said storage tank and said auxiliary tank and provide a signal representing liquid volume change.

27. The storage tank monitoring system recited in claim 26, wherein:
said flow pipe means comprises an inlet pipe and an outlet pipe;
said level adjusting means comprises a pump connected in said outlet pipe to transport liquid from said storage tank to said auxiliary tank;
said level adjusting means further comprising valve means connected in said inlet pipe to allow liquid to flow from said auxiliary tank to said storage tank under the force of gravity;
said level adjustment signal controlling the operation of said pump means and said valve means to maintain substantially constant liquid level in said storage tank.

28. The storage tank monitoring system recited in claim 1, further comprising:
liquid flow pipe means extending from an external location into the liquid in said tank;
level adjusting means connected to said flow pipe means;
auxiliary tank means connected to said flow pipe means through said pump;
means responsive to said rise and fall indication signal to provide a level adjustment signal;
means connecting said level adjustment signal to said level adjusting means to energize said level adjusting means to transport said liquid between said storage tank and said auxiliary tank to maintain the liquid level in said storage tank substantially constant;
precision flow metering means in said flow pipe means to accurately measure the volume of liquid required in a predetermined period of time to maintain substantially constant liquid level; and
means for providing a signal from said flow metering means to said volume computing means representing the volume of liquid transported through said flow metering means;
said volume computing means being responsive to said flow metering means signal to calculate the net amount of liquid transported between said storage tank and said auxiliary tank and provide a signal representing liquid volume change in said storage tank.

29. The storage tank monitoring system recited in claim 28, wherein:
said flow pipe means comprises an inlet pipe and an outlet pipe;
said flow metering means comprises a flow meter connected in each said inlet and outlet pipe.

30. A method for automatically monitoring the change in volume of liquid in a storage tank, said method comprising the steps of:
detecting the existence of liquid level changes from a predetermined level in the storage tank;

actuating liquid transporting means to transport liquid between the storage tank and an auxiliary tank to maintain liquid level in the storage tank substantially constant, the liquid transporting means being actuated when necessary to bring the level of the liquid in the storage tank to the predetermined level;

measuring the volume of liquid transported during a predetermined increment of time between the storage and auxiliary tanks;

providing a signal representing the volume of liquid transported between the storage and auxiliary tanks in that time increment;

substantially automatically detecting temperature changes within the storage tank substantially simultaneously with the time increment for measuring volume changes;

providing a signal representing said temperature changes;

calculating the liquid volume change in the storage tank due to temperature changes in that time increment;

comparing the volume change of the liquid transported between the storage and auxiliary tanks and the volume change due to temperature change in that time increment;

calculating the leak rate of said storage tank from the volume changes due to level changes and temperature changes in that time increment;

providing indications of said leak rate.

31. The method recited in claim 30, wherein said measuring step is accomplished by counting the pumping increments of an incremental positive displacement pump.

32. The method recited in claim 30, wherein said measuring step is accomplished by:
substantially constantly weighing the auxiliary tank; and
periodically computing the volume changes represented by weight changes in said auxiliary tank during each said time increment.

33. The method recited in claim 30, wherein said measuring step is accomplished by placing flow meters in the conduit for liquid transport between the storage and auxiliary tanks.

34. The method recited in claim 30, wherein said detecting step is accomplished by a float actuated pair of HIGH and LOW level sensors.

35. The method recited in claim 34, wherein liquid is added to the storage tank when the LOW level sensor is actuated and liquid is removed form the storage tank when the HIGH level sensor is actuated.

36. The method recited in claim 30, wherein the temperature changes are detected by a highly sensitive thermistor in a bridge circuit whereby temperature changes small as 0.001° F. are detected at an accuracy of ±5%.

37. The method recited in clam 30, wherein the leak rate indication is provided on a strip chart.

38. The method recited in claim 30, wherein the leak rate indication is provided on a video display screen.

39. An automated liquid volume change monitoring system for a storage tank, said system comprising:
level sensor means positioned to detect small changes in liquid level;
means for providing a signal from said level sensor means indicative of rise or fall of liquid level;

means for computing the volume of liquid change in said tank represented by the signal from said liquid level signal providing means;

means for providing a signal representative of liquid volume change due to detected level changes;

temperature sensing means comprising:
electrically variable resistance means located within said tank at a position representative of temperature of the liquid therein, the resistance of said resistance means changing substantially proportionally to the temperature change of the liquid within said tank;
a bridge circuit having said variable resistance means as one of its legs; and
means for providing an output signal from said bridge circuit representative of change in temperature detected by said variable resistance means; means responsive to said signal from said bridge circuit to calculate tank liquid volume change due to temperature change;

means to provide a signal representing thermal liquid volume change;

computation means responsive to said signal representing liquid volume change due to thermal changes and to said signal representing liquid volume change due to detected level changes to provide a signal representing storage tank leak rate;

means for providing indication of the leak rate;

liquid flow pipe means extending from an external location into the liquid in said tank;

pump means connected in said flow pipe means;

auxiliary tank means connected to said flow pipe means through said pump;

means responsive to said rise and fall indication signal to provide a level adjustment signal; and means connecting said level adjustment signal to said pump to energize said pump means to transport said liquid between said storage tank and said auxiliary tank to maintain the liquid level in said storage tank substantially constant;

said volume computing means being responsive to said level adjustment signal to calculate the amount of liquid transported between said storage tank and said auxiliary tank and provide a signal representing liquid volume change.

40. The storage volume volume monitoring system recited n claim 37, wherein said level sensor means and level sensor signal providing means comprises a float device connected to an actuator means for selectively actuating high and low level sensors.

41. The storage tank monitoring system recited in claim 39, wherein said computation means comprises a programmed microcomputer.

42. The storage tank monitoring system recited in claim 40, wherein said computation means comprises a programmed microcomputer.

43. The storage tank monitoring system recited in claim 39, wherein said pump means are incremental, positive displacement pump means.

44. The storage tank monitoring system recited in claim 43, wherein said pump means comprises a liquid adding pump and a liquid removal pump, both coupled in said flow pipe means between said storage tank and said auxiliary tank, said pumps being actuated by the level adjustment signal.

45. The storage tank monitoring system recited in claim 44, wherein said flow pipe means comprises an inlet pipe and an outlet pipe, one of said pumps being connected in each said pipe.

46. An automated liquid volume change monitoring system for a storage tank, said system comprising:

level sensor means positioned to detect small changes in liquid level;

means for providing a signal from said level sensor means indicative of rise or fall of liquid level;

means for computing the volume of liquid change in said tank represented by the signal from said liquid level signal providing means;

means for providing a signal representative of liquid volume change due to detected level changes;

temperature sensing means comprising:

electrically variable resistance means located within said tank at a position representative of temperature of the liquid therein, the resistance of said resistance means changing substantially proportionally to the temperature change of the liquid within said tank;

a bridge circuit having said variable resistance means as one of its legs; and means for providing an output signal from said bridge circuit representative of change in temperature detected by said variable resistance means;

means responsive to said signal from said bridge circuit to calculate tank liquid volume change due to temperature change;

means to provide a signal representing thermal liquid volume change;

computation means responsive to said signal representing liquid volume change due to thermal changes and to said signal representing liquid volume change due to detected level changes to provide a signal representing storage tank leak rate;

means for providing indication of the leak rate;

liquid flow pipe means extending from an external location into the liquid in said tank;

level adjusting means connected in said flow pipe means;

auxiliary tank means connected to said flow pipe means precision weighing means coupled with said auxiliary tank means to accurately determine liquid weight differences within said auxiliary tank means;

means to provide a signal to said volume computing means from said weighing means representing the volume of liquid in said auxiliary tank means;

means responsive to said rise and fall indication signal to provide a level adjustment signal; and means connecting said level adjustment signal to said level adjusting means to energize said level adjusting means to transport said liquid between said storage tank and said auxiliary tank to maintain the liquid level in said storage tank substantially constant;

said volume computing means being responsive to said weighing means signal to calculate the amount of liquid transported between said storage tank and said auxiliary tank and provide a signal representing liquid volume change;

said flow pipe means comprises an inlet pipe and an outlet pipe;

said level adjusting means comprises a pump connected in said outlet pipe to transport liquid from said storage tank to said auxiliary tank;

said level adjusting means further comprising valve means connected in said inlet pipe to allow liquid to flow from said auxiliary tank to said storage tank under the force of gravity;

said level adjustment signal controlling the operation of said pump means and said valve means to maintain substantially constant liquid level in said storage tank.

47. An automated liquid volume change monitoring system for a storage tank, said system comprising:

level sensor means positioned to detect small changes in liquid level;

means for providing a signal from said level sensor means indicative or rise or fall of liquid level;

means for computing the volume of liquid change in said tank represented by the signal from said liquid level signal providing means;

means for providing a signal representative of liquid volume change due to detected level changes;

temperature sensing means comprising:

electrically variable resistance means located within said tank at a position representative of temperature of the liquid therein, the resistance of said resistance means changing substantially proportionally to the temperature change of the liquid within said tank;

a bridge circuit having said variable resistance means as one of its legs; and means for providing an output signal from said bridge circuit representative of change in temperature detected by said variable resistance means;

means responsive to said signal from said bridge circuit to calculate tank liquid volume change due to temperature change;

means to provide a signal representing thermal liquid volume change;

computation means responsive to said signal representing liquid volume change due to thermal changes and to said signal representing liquid volume change due to detected level changes to provide a signal representing storage tank leak rate;

means for providing indication of the leak rate;

liquid flow pipe means extending from an external location into the liquid in said tank;

leveling adjusting means connected in said flow pipe means;

auxiliary tank means connected to said flow pipe means through a pump;

means responsive to said rise and fall indication signal to provide a level adjustment signal;

means connecting said level adjustment signal to said level adjusting means to energize said level adjusting means to transport said liquid between said storage tank and said auxiliary tank to maintain the liquid level in said storage tank substantially constant;

precision flow metering means in said flow pipe means to accurately measure the volume of liquid required in a predetermined period of time to maintain substantially constant liquid level; and means for providing a signal from said flow metering means to said volume computing means representing the volume of liquid transported through said flow metering means;

said volume computing means being responsive to said flow metering means signal to calculate the net amount of liquid transported between said storage tank and said auxiliary tank and provide a signal representing liquid volume change in said storage tank.

48. The storage tank monitoring system recited in claim 47, wherein:

said flow pipe means comprises an inlet pipe and an outlet pipe;

said flow metering means comprises a flow meter connected in each said inlet and outlet pipe.

49. The method recited in 30, wherein said calculating steps are accomplished automatically.

50. The storage tank monitoring system recited in claim 1, wherein said indication means comprises a computer storage disk.

51. The storage tank monitoring system recited in claim 17, wherein said pump means comprises a liquid adding pump and a liquid removal pump, both coupled between said auxiliary tank and said storage tank in said flow pipe means and being actuated by the level adjustment signal.

* * * * *

UNITED STATES PATENT AND TRADEMARK OFFICE
CERTIFICATE OF CORRECTION

PATENT NO. : 4,672,842

DATED : June 16, 1987

INVENTOR(S) : Detlev E. M. Hasselmann

It is certified that error appears in the above-identified patent and that said Letters Patent is hereby corrected as shown below:

Column 13 (claim 1), line 5, "temperature . . ." should start a new paragraph.

Column 15 (claim 26), line 60, change "pump" to --level adjusting means--.

Column 16 (claim 28), line 35, change "pump" to --level adjusting means--.

Signed and Sealed this

Fourteenth Day of March, 1989

Attest:

DONALD J. QUIGG

*Attesting Officer*   *Commissioner of Patents and Trademarks*